United States Patent
Fujita et al.

(10) Patent No.: US 6,369,187 B1
(45) Date of Patent: *Apr. 9, 2002

(54) REACTIVE SILICON GROUP-CONTAINING OXYPROPYLENE POLYMER AND METHOD OF PRODUCING SAME

(75) Inventors: Masayuki Fujita; Michihide Homma; Hiroshi Wakabayashi, all of Hyogo (JP)

(73) Assignee: Kanegafuchi Chemical Industry Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/655,279

(22) Filed: May 15, 1996

Related U.S. Application Data

(63) Continuation of application No. 08/504,884, filed on Jul. 20, 1995, now abandoned, which is a continuation of application No. 08/338,979, filed on Nov. 14, 1994, now abandoned, which is a continuation of application No. 07/777,276, filed as application No. PCT/JP91/00461 on Apr. 8, 1991, now abandoned.

(30) Foreign Application Priority Data

Apr. 9, 1990 (JP) ............................................. 2-94543

(51) Int. Cl.$^7$ ............................................. C08G 65/32
(52) U.S. Cl. ........................................ 528/29; 525/403
(58) Field of Search ..................... 528/29; 515/403, 515/410

(56) References Cited

U.S. PATENT DOCUMENTS 4,788,254 A * 11/1988 Kawckubo et al. ......... 525/100
4,904,745 A * 2/1990 Inoue et al. ................. 525/404
4,965,311 A * 10/1990 Hirose et al. ............... 524/483

FOREIGN PATENT DOCUMENTS

| JP | 46-27250 | 8/1971 |
|---|---|---|
| JP | 59-15336 | 4/1984 |
| JP | 61-197631 | 9/1986 |
| JP | 61-215622 | 9/1986 |
| JP | 61-215623 | 9/1986 |
| JP | 61-218632 | 9/1986 |

* cited by examiner

*Primary Examiner*—Patricia A. Short
(74) *Attorney, Agent, or Firm*—Jordan and Hamburg LLP

(57) ABSTRACT

This invention provides a novel reactive silicon group-containing oxypropylene polymer and a method of producing the same. The reactive silicon group-containing oxypropylene polymer of the invention is an oxypropylene polymer the main polymer chain of which is essentially composed of a repeating unit of the formula

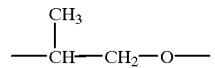

and which has at least one reactive silicon group and at least one urethane bond each terminal to the chain, an $\bar{M}w/\bar{M}n$ ratio of not more than 1.5 and a number average molecular weight of not less than 3,000. The production method of the invention is characterized by reacting an oxypropylene polymer having an $\bar{M}w/\bar{M}n$ ratio of not more than 1.5 and a number average molecular weight per terminal functional group of not less than 1,500 with a compound having a reactive silicon group and an isocyanato group.

2 Claims, No Drawings

REACTIVE SILICON GROUP-CONTAINING OXYPROPYLENE POLYMER AND METHOD OF PRODUCING SAME

This application is a continuation-in-part division of application Ser. No. 08/504,884, filed Jul. 20, 1995, now abandoned, which is a continuation of application Ser. No. 08/338,979, filed Nov. 14, 1994, now abandoned, which is a continuation of application Ser. No. 07/777,276, filed Nov. 25, 1991, now abandoned which is a 371 of PCT/JP91/00461 filed Apr. 8, 1991.

BACKGROUND OF THE INVENTION

This invention relates to a novel oxypropylene polymer which contains a reactive silicon group and to a method of producing the same.

So far, various room temperature curing polymers have been developed which can be cured to rubber-like substances by the action of moisture. Thus, oxypropylene polymers containing a reactive silicon group (a group which is a silicon atom-containing group with a hydroxyl group or a hydrolyzable group being bound to the silicon atom and can form a siloxane bond) are also known.

However, since it is difficult to produce high molecular weight polyoxypropylene with a narrow molecular weight distribution (great monodispersity), the known reactive silicon group-containing polyoxypropylene species are only those showing a broad molecular weight distribution (great polydispersity).

Recently, it has been reported that polyoxypropylene with a narrow molecular weight distribution can be obtained. The present inventors found that polymers derived from polyoxypropylene having a narrow molecular weight distribution, which is used as the main chain, by introducing a reactive silicon group and a urethane bond terminally to the main chain, have a low viscosity, hence are easy to handle, before curing and, after curing, give cured products having excellent tensile characteristics as well as good chemical resistance and water resistance. This finding has now led to the present invention.

SUMMARY OF THE INVENTION

The reactive silicon group-containing oxypropylene polymer of this invention is an oxypropylene polymer the main polymer chain of which is essentially composed of a repeating unit of the formula

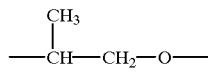

and which has at least one terminal reactive silicon group and at least one terminal urethane bond. It has an $\overline{M}w/\overline{M}n$ ratio of not more than 1.5 and a number average molecular weight of not less than 3,000.

The production method of this invention is characterized by reacting an oxypropylene polymer having an $\overline{M}w/\overline{M}n$ ratio of not more than 1.5 and a number average molecular weight per terminal functional group of not less than 1,500 with a compound having a reactive silicon group and an isocyanato group.

DESCRIPTION OF THE PREFERRED EMBODIMENTS

The "reactive silicon group" as so termed herein is not limited to any particular species but may typically include groups of the general formula (1) shown below:

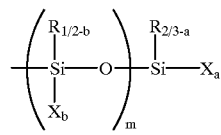

In the above formula, $R^1$ and $R^2$ each is an alkyl group containing 1 to 20 carbon atoms, an aryl group containing 6 to 20 carbon atoms, an aralkyl group containing 7 to 20 carbon atoms or a triorganosiloxy group of the formula $(R')_3SiO$—. Where there are two or more $R^1$ or $R^2$ groups, they may be the same or different. R' is a monovalent hydrocarbon group containing 1 to 20 carbon atoms. The three R' groups may be the same or different. X is a hydroxyl group or a hydrolyzable group and, where there are two or more X groups, they may be the same or different. a is 0, 1, 2 or 3 and b is 0, 1 or 2. The number b may vary in the m groups of the formula

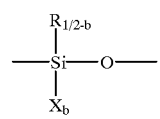

m is an integer of 0 or 1 to 19. The following condition shall be satisfied: $a+\Sigma b \geq 1$.

The hydrolyzable group represented by the above-mentioned X is not particularly limited but may be any hydrolyzable group known in the art. More specifically, there may be mentioned a hydrogen atom, a halogen atom, an alkoxy group, an acyloxy group, a ketoximato group, an amino group, an amido group, an acid amido group, an aminoxy group, a mercapto group, an alkenyloxy group and the like. Among these, the hydrogen atom and alkoxy, acyloxy, ketoximato, amino, amido, aminoxy, mercapto and alkenyloxy groups are preferred. From the viewpoint of mild hydrolyzability and easy handling, alkoxy groups are particularly preferred.

One to three such hydrolyzable groups or hydroxyl groups may be bound to one silicon atom, and $(a+\Sigma b)$ is preferably equal to 1 to 5. Where there are two or more hydrolyzable groups or hydroxyl groups in the reactive silicon group, they may be the same or different.

The reactive silicon group may contain one silicon atom or two or more silicon atoms. In the case of a reactive silicon group comprising silicon atoms linked to one another via a siloxane bonding or the like, the group may contain about 20 silicon atoms.

Reactive silicon groups of the following general formula (2) are preferred because of ready availability.

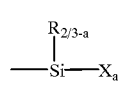

In the above formula, $R^2$, X and a are as defined above.

Specific examples of $R^1$ and $R^2$ appearing in the general formula (1) given hereinabove include, among others, alkyl groups, such as methyl and ethyl, cycloalkyl groups, such as cyclohexyl, aryl groups, such as phenyl, aralkyl groups, such as benzyl, and triorganosiloxy groups of the formula $(R')_3$ SiO— in which R' is methyl or phenyl. Among these, methyl is particularly preferred.

The oxypropylene polymer should recommendably contain at least one, preferably 1.1 to 5 reactive silicon groups per molecule thereof. When the number of reactive silicon groups contained in the polymer on a per-molecule basis is less than 1, the curability becomes inadequate and good rubber elastic behavior can hardly be developed.

The oxypropylene polymer contains at least one reactive silicon group terminally to the molecular chain thereof. It may contain a reactive silicon group internally to the chain. When the reactive silicon group occurs terminally to the molecular chain, as in the present invention, the oxypropylene polymer component contained in the finally-formed cured products can have an increased number of effective network chains and therefore a rubber-like cured product showing high strength and high elongation (low elasticity) can readily be obtained.

The "urethane bond" so termed herein means a bond represented by —NHCOO—.

The oxypropylene polymer, which constitutes the main polymer chain in the polymer of this invention, is essentially composed of a repeating unit of the formula

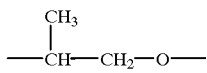

This oxypropylene polymer may be straight-chained or branched, or a mixture of these. It may further contain a small proportion of another monomer unit or the like.

The oxypropylene polymer that can effectively be used has a number average molecular weight of not less than 3,000. The number average molecular weight of the polymer should preferably be not less than 3,000 when the polymer is straight-chained, and not less than 5,000 when the polymer is branched. More preferably, the polymer should have a number average molecular weight of 6,000 to 30,000. Furthermore, in this oxypropylene polymer, the weight average molecular weight/number average molecular weight ratio ($\overline{Mw}/\overline{Mn}$) is not more than 1.5, hence the molecular weight distribution is very narrow (the monodispersity is great). The value of $\overline{Mw}/\overline{Mn}$ should preferably be not more than 1.4, more preferably not more than 1.3. The molecular weight distribution can be measured by various methods. Generally, however, the measurement method most commonly used is gel permeation chromatography (GPC). Since the molecular weight distribution is narrow in that manner despite the great number average molecular weight, the polymer of the invention has a low viscosity before curing, hence is easy to handle and, after curing, shows good rubber elastic behavior.

The polymer of this invention has a terminal urethane bond, so that the cured products after curing are excellent in strength and elongation.

For producing the reactive silicon group-containing oxypropylene polymer of the invention, it is only necessary to react an oxypropylene polymer having a terminal functional group (hereinafter referred to as functional group Y), such as a hydroxyl group, with a compound having a reactive silicon group and an isocyanato group reactive with functional group Y.

The functional group Y-containing oxypropylene polymer to be used should be an oxypropylene polymer having an $\overline{Mw}/\overline{Mn}$ ratio of not more than 1.5 and a number average molecular weight per terminal functional group of not less than 1,500.

The isocyanato group- and reactive silicon group-containing compound includes, but is not limited to, such typical examples as γ-isocyanatopropyltriethoxysilane, γ-isocyanatopropylmethyldimethoxysilane, γ-isocyanatopropyltrimethoxysilane and the like isocyanato-containing silanes.

The production method of the invention which comprises reacting an oxypropylene polymer having a terminal functional group Y with a compound having an isocyanato group and a reactive silicon group, as mentioned above, allows introduction of the reactive silicon group in one step without necessitating complicated prior art reaction steps.

The reactive silicon group-containing oxypropylene polymer of the invention, when exposed to air, forms a three-dimensional network under the action of moisture and hardens to a solid having rubber-like elasticity.

In curing the polymer of this invention, a silanol condensing catalyst (curing catalyst) may be used or may not be used. When a silanol condensing catalyst is used, it may be selected from a wide variety of known ones. As typical examples thereof, there may be mentioned such silanol condensing catalysts as titanate esters, such as tetrabutyl titanate and tetrapropyl titanate; tin carboxylate salts, such as dibutyltin dilaurate, dibutyltin maleate, dibutyltin diacetate, tin octanoate and tin naphthenate; reaction products from dibutyltin oxide and phthalate esters; dibutyltin diacetylacetonate; organic aluminum compounds, such as aluminum trisacetyl-acetonate, aluminum tris ethyl acetoacetate) and diisopropoxyaluminum ethyl acetoacetate; chelate compounds such as zirconium tetracetylacetonate and titanium tetracetylacetonate; lead octanoate; amine compounds, such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo-[15.4.0]undecene-7 (DBU), salts of such amine compounds with carboxylic acids and so forth; low molecular weight polyamide resins obtained from an excess of a polyamine and a polybasic acid; reaction products from an excess of a polyamine and an epoxy compound; amino-containing silane coupling agents, such as γ-aminopropyltrimethoxysilane and N-(β-aminoethyl)-aminopropylmethyldimethoxysilane; and other known silanol condensing catalysts, such as acid catalysts and basic catalysts. These catalysts may be used either singly or in combination in the form of a mixture of two or more of them.

These silanol condensing catalysts are used preferably in an amount of about 0.1 to 20 parts by weight, more preferably about 1 to 10 parts by weight, per 100 parts by weight of the oxypropylene polymer. When the amount of the silanol condensing catalyst is too small as compared with the oxypropylene polymer, the rate of curing may be slow in certain instances and the curing reaction can hardly proceed to a satisfactory extent in some instances. On the other hand, if the amount of the silanol condensing catalyst is too large relative to the oxypropylene polymer, local heat generation and/or foaming may occur during curing, unfavorably making it difficult to obtain good cured products.

The reactive silicon group-containing oxypropylene polymer of the invention may be modified by incorporating thereinto various fillers. Usable as the fillers are reinforcing fillers such as fumed silica, precipitated silica, silicic anhydride, hydrous silicic acid and carbon black; fillers such as calcium carbonate, magnesium carbonate, diatomaceous earth, calcined clay, clay, talc, titanium oxide, bentonite, organic bentonite, ferric oxide, zinc oxide, active zinc white, and "shirasu" balloons; and fibrous fillers such as asbestos, glass fibers and filaments.

For obtaining cured compositions affording high strength using such fillers, a filler selected from among fumed silica, precipitated silica, anhydrous silicic acid, hydrous silicic acid, carbon black, surface-treated finely divided calcium carbonate, calcined clay, clay, active zinc white and the like is used in the main in an amount within the range of 1 to 100 parts by weight per 100 parts by weight of the reactive silicon group-containing oxypropylene polymer to give favorable results. For obtaining cured compositions affording low strength and high elongation, a filler selected from among titanium oxide, calcium carbonate, magnesium carbonate, talc, ferric oxide, zinc oxide, "shirasu" balloons and the like is used in the main in an amount within the range of 5 to 200 parts by weight per 100 parts by weight of the reactive silicon group-containing oxypropylene polymer to give favorable results. Of course, these fillers may be used either alone or in combination as a mixture of two or more of them.

In using the reactive silicon group-containing oxypropylene polymer in accordance with the invention, a plasticizer may be used more effectively in combination with the filler since the use thereof may provide the cured products with an increased elongation and/or allow incorporation of fillers in large amounts. This plasticizer is any one in common and general use. Thus, for instance, phthalate esters, such as dioctyl phthalate, dibutyl phthalate and butyl benzyl phathalate; aliphatic dibasic acid esters, such as dioctyl adipate, isodecyl succinate and dibutyl sebacate; glycol esters, such as diethylene glycol dibenzoate and pentaerythritol esters; aliphatic esters, such as butyl oleate and methyl acetylricinoleate; phosphate esters, such as tricresyl phosphate, trioctyl phosphate and octyl diphenyl phosphate; epoxy plasticizers, such as epoxidized soybean oil, and benzyl epoxystearate; polyester plasticizers, such as polyesters from a dibasic acid and a dihydric alcohol; polyethers, such as polypropylene glycol and derivatives thereof; polystyrenes, such as poly-α-methylstyrene and polystyrene; polybutadiene, butadiene-acrylonitrile copolymer, polychloroprene, polyisoprene, polybutene, chlorinated paraffin, and so forth may be used either singly or in combination in the form of a mixture of two or more of them, as desired. Favorable results are obtained when the plasticizer is used in an amount within the range of 0 to 100 parts by weight per 100 parts by weight of the reactive silicon group-containing oxypropylene polymer.

In using the reactive silicon group-containing oxypropylene polymer of the invention, various additives, such as tackifiers (e.g. phenol resins, epoxy resins), adhesion improvers, physical property modifiers, storage stability improvers, antioxidants, ultraviolet absorbers, metal inactivators, antiozonants, light stabilizers, amine-type radical chain inhibitors, phosphorus-containing peroxide decomposing agents, lubricants, pigments, blowing agents, etc., may be added to the polymer as necessary each in an appropriate amount to give room temperature curable compositions.

For further illustrating the invention, the following examples are given.

EXAMPLE 1

A flask equipped with a stirrer was charged with 220 g (0.0447 equivalent) of polyoxypropylene triol having a number average molecular weight of 15,000 ($\overline{Mw}/\overline{Mn}$=1.38, viscosity=89 poise) and 0.02 g of dibutyltin dilaurate and, in a nitrogen atmosphere, 8.45 g (0.0447 equivalent) of γ-isocyanatopropyl-methyldimethoxysilane was added dropwise at room temperature. After completion of the dropping, the reaction was conducted at 75° C. for 1.5 hours. IR spectrum measurement was performed and, after confirmation of the disappearance of the NCO absorption at about 2280 $cm^{-1}$ and of the formation of a C=O absorption at about 1730 $cm^{-1}$ the reaction was discontinued. A colorless and transparent polymer (213 g) was obtained.

COMPARATIVE EXAMPLE 1

A 1.5-liter pressure-resistant glass reaction vessel was charged with 401 g (0.081 equivalent) of polyoxypropylene triol having a molecular weight of 15,000 ($\overline{Mw}/\overline{Mn}$=1.38, viscosity=89 poise) and the contents were placed under a nitrogen atmosphere.

At 137° C., 19.1 g (0.099 equivalent) of a 28% solution of sodium methoxide in methanol was added dropwise from a dropping funnel and the reaction was conducted for 5 hours. Then, the volatile matter was removed under reduced pressure. Again in a nitrogen atmosphere, 9.0 g (0.118 equivalent) of allyl chloride was added dropwise and the reaction was carried out for 1.5 hours, and then the allylation was further conducted using 5.6 g (0.029 equivalent) of a 28% solution of sodium methoxide in methanol and 2.7 g (0.035 equivalent) of allyl chloride.

The reaction product was dissolved in hexane and the solution was subjected to adsorption treatment with aluminum silicate. After removal of the hexane under reduced pressure, there was obtained 311 g of a yellow and transparent polymer (viscosity 68 poise).

A pressure-resistant glass reaction vessel was charged with 270 g (0.065 equivalent) of the above polymer and the contents were placed under a nitrogen atmosphere. After addition of 0.075 ml of a chloroplatinic acid catalyst solution (prepared by dissolving 25 g of $H_2PtCl_6 \cdot 6H_2O$ in 500 g of isopropyl alcohol), the mixture was stirred for 30 minutes. Dimethoxymethylsilane (6.24 g, 0.059 equivalent) was added from a dropping funnel and the reaction was carried out at 90° C. for 4 hours. After volatile matter removal, there was obtained 260 g of a yellow and transparent polymer.

COMPARATIVE EXAMPLE 2

A pressure-resistant glass reaction vessel was charged, after nitrogen substitution, with 420 g of polyoxypropylene glycol having a number average molecular weight of 3,000 and 80 g of polyoxypropylene triol having a number average molecular weight of 3,000. After addition of 40 g of sodium hydroxide, the reaction was carried out at 60° C. for 13 hours, then 19 g of bromochloromethane was added and a further reaction was conducted at 60° C. for 10 hours. (The polymer thus obtained had an $\overline{Mw}/\overline{Mn}$ of 2.1 and a viscosity of 385 poise.)

Then, 15 g of allyl chloride was added and the reaction was conducted for 36 hours. After completion of the reaction, the volatile matter was removed under reduced pressure.

The contents were transferred to a beaker, dissolved in hexane, and subjected to adsorption treatment with aluminum silicate, followed by removal of the hexane under reduced pressure.

A reaction vessel was charged, after nitrogen substitution, with 500 g of the polymer, then 0.03 g of a chloroplatinic acid catalyst solution (prepared by dissolving 25 g of H₂PtCl₆·6H₂O in 500 g of isopropyl alcohol) was added, thereafter 12 g of dimethoxymethylsilane was added, and the reaction was carried out at 800° C. for 4 hours. After completion of the reaction, the volatile matter was removed under reduced pressure, whereupon 550 g of a pale-yellow, transparent polymer was obtained.

The viscosity of each of the polymers obtained in Example 1 and Comparative Examples 1 and 2 was determined at 23° C. using a type B viscometer (BM type rotar No. 4, 12 rpm). Each polymer was also analyzed for number average molecular weight ($\overline{Mn}$) and molecular weight distribution ($\overline{Mw}/\overline{Mn}$) by GPC. The GPC was performed at an oven temperature of 40° C. using a column packed with a polystyrene gel (Tosoh Corporation) and tetrahydrofuran as the eluent. The results are shown in Table 1.

TABLE 1

| Polymer | Viscosity (poise) | Number average molecular weight (Mn) | Molecular weight distribution (Mw/Mn) |
|---|---|---|---|
| Example 1 | 150 | $1.7 \times 10^4$ | 1.4 |
| Comparative Example 1 | 88 | $1.8 \times 10^4$ | 1.5 |
| Comparative Example 2 | 380 | $1.8 \times 10^4$ | 2.3 |

EXAMPLE 2 AND COMPARATIVE EXAMPLE 3

One hundred (100) parts by weight of the polymer obtained in Example 1 or Comparative Example 1 was kneaded with 3 parts by weight of tin octanoate, 0.5 part by weight of laurylamine and 0.6 part by weight of water and the mixture was spread to give a sheet-like material, which was cured at room temperature for 2 days and further at 500° C. for 3 days.

JIS No. 3 dumbbells were cut out from the cured sheets in accordance with JIS K 6301 and subjected to tensile testing for determining the tensile strength at break (TB) and elongation at break (EB). The results are shown in Table 2.

TABLE 2

| | Polymer used | TB (kg/cm²) | EB (%) |
|---|---|---|---|
| Example 2 | Example 1 | 5.2 | 140 |
| Comparative Example 3 | Comparative Example 1 | 4.3 | 75 |

EXAMPLE 3 AND COMPARATIVE EXAMPLE 4

One hundred (100) parts by weight of the polymer obtained in Example 1 or Comparative Example 1 was thoroughly admixed with 50 parts by weight of Epikote 828 (bisphenol A type epoxy resin produced by Yuka Shell Epoxy), 1 part by weight of Nocrac SP (monophenolic antioxidant produced by Ouchi Shinko Kagaku Kogyo), 5 parts by weight of 2,4,6-tris(dimethylaminomethyl)phenol (DMP-30), 1 part by weight of N-β-(aminoethyl)-γ-aminopropyltrimethoxysilane, 1 part by weight of #918 (organotin compound produced by Sankyo Yuki Gosei) and 0.4 part by weight of water. The resultant mixture was poured into a polyethylene frame with care to prevent air bubbles from entering, and cured at 23° C. for 2 days and further at 50° C. for 3 days to give a cured sheet having a thickness of 2 mm.

No. 3 dumbbells were cut out from the thus-obtained cured sheets in accordance with JIS K 6301 and subjected to tensile testing at a pulling rate of 500 mm/min. The results are shown in Table 3.

In the table, "M100" means the stress at 100% elongation, "TB" the tensile strength at break and "EB" the elongation at break.

TABLE 3

| | Polymer used | M100 (kg/cm²) | TB (kg/cm²) | EB (%) |
|---|---|---|---|---|
| Example 3 | Example 1 | 16 | 76 | 315 |
| Comparative Example 4 | Comparative Example 1 | 14 | 38 | 235 |

INDUSTRIAL APPLICABILITY

As mentioned above, the reactive silicon group-containing oxypropylene polymer of the invention has a narrow molecular weight distribution despite its high number average molecular weight, therefore shows a lower viscosity and, hence is easier to handle, before curing as compared with conventional polymers having the same molecular weight and a broader molecular weight distribution.

The low viscosity before curing as mentioned above not only improves the processability but also enables incorporation of a large amount of filler to give an excellent room temperature curable composition.

After curing, the crosslinking network becomes uniform and the cured products show good rubber-like elastic behaviors, for example improved elongation characteristics.

The polymer of the invention has a terminal urethane bond, so that the cured products after curing are excellent in strength and elongation.

Furthermore, the chemical resistance, for example acid resistance, is improved to an unexpectedly great extent. The water resistance is excellent as well.

Thus, the reactive silicon group-containing oxypropylene polymer of the invention is of very high practical value.

The production method of the invention is superior in that reactive silicon group introduction can be effected in one step without requiring complicated prior art reaction steps.

Compositions containing the reactive silicon group-containing oxypropylene polymer of this invention are particularly useful as elastic sealants and can be used as sealants for buildings, ships, automobiles, roads, etc. Furthermore, these compositions, either as such or with the aid of a primer, can closely adhere to a wide variety of substances, such as glass, ceramics, wood, metals and resin moldings and therefore can be used as various types of sealing compositions or adhesive compositions. Furthermore, they are useful also as food packaging materials, rubber materials for casting and materials for templating.

What is claimed is:

1. An oxypropylene polymer having a main polymer chain derived from polyoxypropylene triol and consisting essentially of a repeating unit of the formula

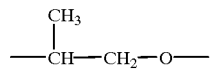

having at least one reactive silicon group and at least one urethane bond each terminal to said main chain, an $\overline{Mw}/\overline{Mn}$ ratio of not more than 1.5 and a number average molecular weight of not less than 3,000.

2. A method of producing reactive silicon group-containing oxypropylene polymers comprising reacting polyoxypropylene triol having an $\overline{M}w/\overline{M}n$ ratio of not more than 1.5 and a number average molecular weight per terminal functional group of not less than 1,500 with a compound having a reactive silicon group and an isocyanato group.

* * * * *